US009161346B2

(12) United States Patent
Kim et al.

(10) Patent No.: US 9,161,346 B2
(45) Date of Patent: Oct. 13, 2015

(54) METHOD FOR TRANSMITTING CONTROL CHANNEL IN MULTICELL COOPERATIVE WIRELESS COMMUNICATION SYSTEM AND DEVICE THEREFOR

(75) Inventors: Hyungtae Kim, Anyang-si (KR); Inkwon Seo, Anyang-si (KR); Jonghyun Park, Anyang-si (KR); Youngseob Choi, Anyang-si (KR); Seungmin Lee, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 13/983,296

(22) PCT Filed: Feb. 22, 2012

(86) PCT No.: PCT/KR2012/001356
§ 371 (c)(1),
(2), (4) Date: Aug. 1, 2013

(87) PCT Pub. No.: WO2012/115450
PCT Pub. Date: Aug. 30, 2012

(65) Prior Publication Data
US 2013/0315186 A1 Nov. 28, 2013

Related U.S. Application Data

(60) Provisional application No. 61/445,541, filed on Feb. 23, 2011.

(51) Int. Cl.
*H04W 72/04* (2009.01)
*H04L 5/00* (2006.01)
*H04W 88/08* (2009.01)
*H04L 1/00* (2006.01)
*H04L 1/18* (2006.01)

(52) U.S. Cl.
CPC .......... *H04W 72/0406* (2013.01); *H04L 5/0035* (2013.01); *H04L 5/0044* (2013.01); *H04L 5/0053* (2013.01); *H04L 1/0031* (2013.01); *H04L 1/1861* (2013.01); *H04W 88/085* (2013.01)

(58) Field of Classification Search
CPC ............. H04B 7/024; H04W 72/0406; H04W 88/085; H04L 5/0035; H04L 5/0053; H04L 1/0031; H04L 1/1861
See application file for complete search history.

(56) References Cited

U.S. PATENT DOCUMENTS

| 8,705,510 B2 * | 4/2014 | Kim et al. ...................... 370/350 |
| 2008/0227449 A1 * | 9/2008 | Gholmieh et al. ............. 455/434 |

(Continued)

FOREIGN PATENT DOCUMENTS

WO 2011013990 A2 2/2011

OTHER PUBLICATIONS

R1-106144, "Impact of CRS interference", 3GPP TSG RAN WG1 Meeting #63, Nov. 19, 2010.

*Primary Examiner* — Brian D Nguyen
(74) *Attorney, Agent, or Firm* — Dentons US LLP

(57) ABSTRACT

Disclosed is a method for transmitting a control channel in a multicell cooperative wireless communication system. More particularly, the present invention comprises the steps of: a $1^{st}$ transmitting end transmitting a control channel and a data channel, and at least one $2^{nd}$ transmitting end transmitting only the data channel, in a $1^{st}$ subframe; and the $1^{st}$ transmitting end transmitting only the data channel and the at least one $2^{nd}$ transmitting end transmitting the control channel and the data channel, in a $2^{nd}$ subframe, wherein the data channel transmitted by the at least one $2^{nd}$ transmitting end in the $1^{st}$ subframe is decoded on the basis of the control channel transmitted by the at least one $2^{nd}$ transmitting end in the $2^{nd}$ subframe.

16 Claims, 11 Drawing Sheets

(56) References Cited

U.S. PATENT DOCUMENTS

| | | | |
|---|---|---|---|
| 2009/0252077 A1* | 10/2009 | Khandekar et al. | 370/312 |
| 2010/0041409 A1* | 2/2010 | Kim et al. | 455/450 |
| 2010/0080269 A1* | 4/2010 | Kim et al. | 375/211 |
| 2010/0189038 A1 | 7/2010 | Chen et al. | |
| 2011/0255484 A1* | 10/2011 | Zhang et al. | 370/329 |
| 2012/0052795 A1* | 3/2012 | Shen et al. | 455/7 |
| 2012/0213096 A1* | 8/2012 | Krishnamurthy et al. | 370/252 |

* cited by examiner (a) Control-plane protocol stack (b) User-plane protocol stack

METHOD FOR TRANSMITTING CONTROL CHANNEL IN MULTICELL COOPERATIVE WIRELESS COMMUNICATION SYSTEM AND DEVICE THEREFOR

This Application is a 35 U.S.C. §371 National Stage Entry of International Application No. PCT/KR2012/001356, filed Feb. 22, 2012 and claims the benefit of U.S. Provisional Application No. 61/445,541, filed Feb. 23, 2011, all of which are incorporated by reference in their entirety herein.

TECHNICAL FIELD

The present invention relates to a wireless communication system, and more particularly, to a method of transmitting a control channel in a multi-cell cooperative wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Problem

Based on the above-mentioned discussion, a method of transmitting a control channel in a multi-cell cooperative wireless communication system and apparatus therefor shall be proposed in the following description.

Technical Solution

To achieve these and other advantages and in accordance with the purpose of the present invention, as embodied and broadly described, in a multi-cell cooperative wireless communication system, a method of transmitting a downlink signal according to one embodiment of the present invention may include the steps of transmitting a control channel and a data channel from a $1^{st}$ transmitting end and transmitting the data channel only by at least one $2^{nd}$ transmitting end, in a $1^{st}$ subframe, and transmitting the data channel only from the $1^{st}$ transmitting end and transmitting the control channel and the data channel from the at least one $2^{nd}$ transmitting end, in a $2^{nd}$ subframe, wherein the data channel transmitted from the at least one $2^{nd}$ transmitting end in the $1^{st}$ subframe is decoded based on the control channel transmitted from the at least one $2^{nd}$ transmitting end in the $2^{nd}$ subframe.

Preferably, the data channel transmitted from the at least one $2^{nd}$ transmitting end in the $1^{st}$ subframe may include the data channel for a coordinated communication transmitted from the $1^{st}$ transmitting end and the at least one $2^{nd}$ transmitting end to a specific user equipment. More preferably, the method may further include the step of transmitting a control channel for decoding the data channel for the coordinated communication from the at least one $2^{nd}$ transmitting end in the $1^{st}$ subframe.

Preferably, the at least one $2^{nd}$ transmitting end does not transmit the control channel on a control region in the $1^{st}$ subframe and the $1^{st}$ transmitting end does not transmit the control channel on the control region in the $2^{nd}$ subframe.

Preferably, a response signal in response to the data channel transmitted from the at least one $2^{nd}$ transmitting end in the $1^{st}$ subframe is received in a subframe after a predetermined time later than the $2^{nd}$ subframe in which the control channel is transmitted from the at least one $2^{nd}$ transmitting end.

Preferably, the method may further include the step of transmitting the control channel and the data channel from the $1^{st}$ transmitting end and transmitting the data channel from the at least one $2^{nd}$ transmitting end in a $3^{rd}$ subframe. And, the data channel transmitted from the at least one $2^{nd}$ transmitting end in the $3^{rd}$ subframe may be decoded based on the control channel transmitted from the at least one $2^{nd}$ transmitting end in the $2^{nd}$ subframe.

More preferably, a response signal in response to the data channel transmitted from the at least one $2^{nd}$ transmitting end in the $3^{rd}$ subframe is received in a subframe after a predetermined time later than the $2^{nd}$ subframe in which the control channel is transmitted from the at least one $2^{nd}$ transmitting end.

To further achieve these and other advantages and in accordance with the purpose of the present invention, as embodied and broadly described, a multi-cell cooperative wireless communication system according to another embodiment of the present invention may include a $1^{st}$ transmitting end for transmitting a control channel and a data channel in a $1^{st}$ subframe and for transmitting the data channel only in a $2^{nd}$ subframe and a $2^{nd}$ transmitting end for transmitting the data channel only in the $1^{st}$ subframe and for transmitting the control channel and the data channel in the $2^{nd}$ subframe, wherein the data channel transmitted from the at least one $2^{nd}$ transmitting end in the $1^{st}$ subframe is decoded based on the control channel transmitted from the at least one $2^{nd}$ transmitting end in the $2^{nd}$ subframe.

According to the above-mentioned embodiments, the $1^{st}$ transmitting end and the at least one $2^{nd}$ transmitting end is characterized in having a same cell identifier.

Advantageous Effects

According to an embodiment of the present invention, a control channel can be more effectively transmitted in a multi-cell cooperative wireless communication system.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 1:
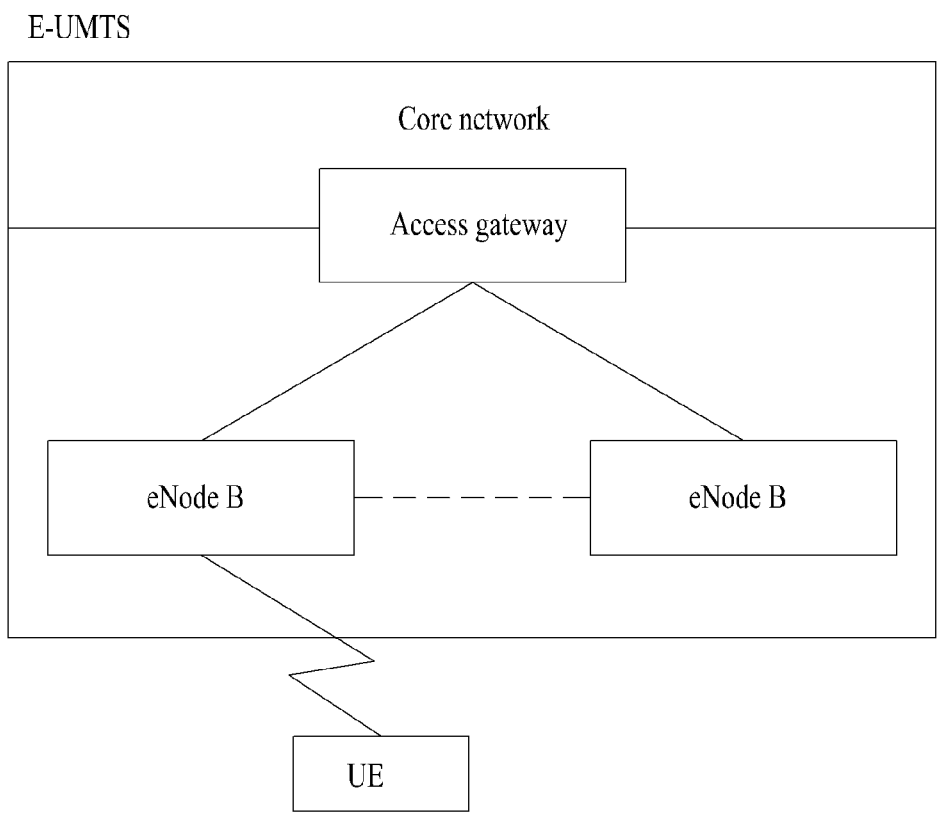
FIG. 1 is a schematic diagram of E-UMTS network structure as an example of a mobile communication system.
Figure 2:
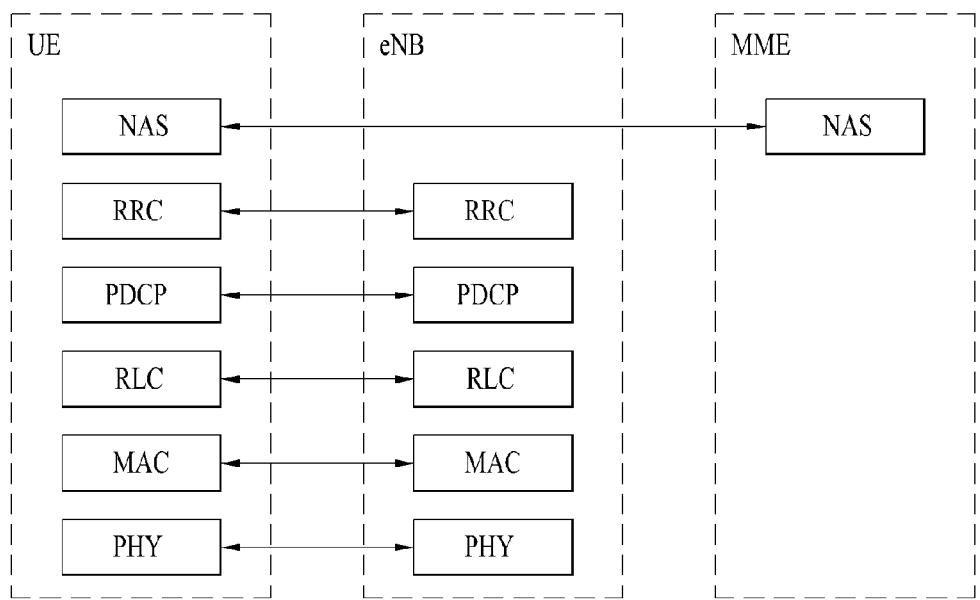
FIG. 2 is a diagram of structures of control and user planes of a radio interface protocol between a user equipment and E-UTRAN based on 3GPP radio access network specification.
Figure 2:
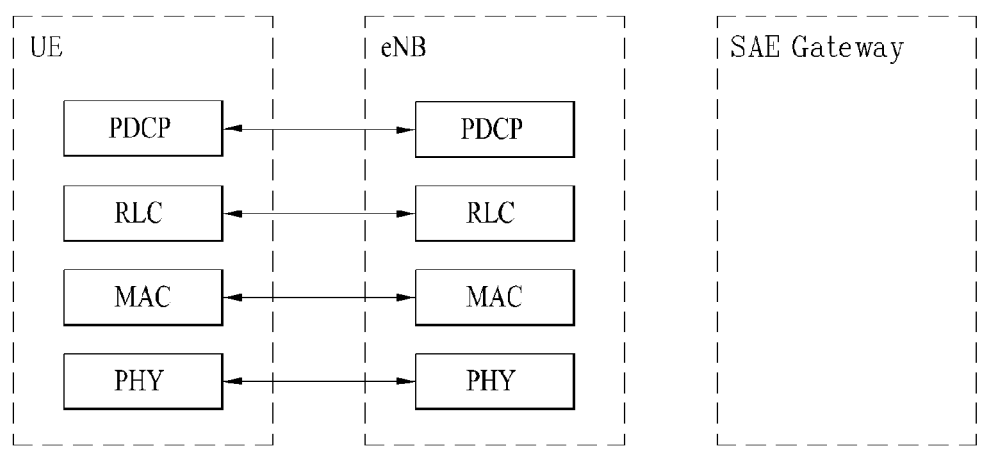

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
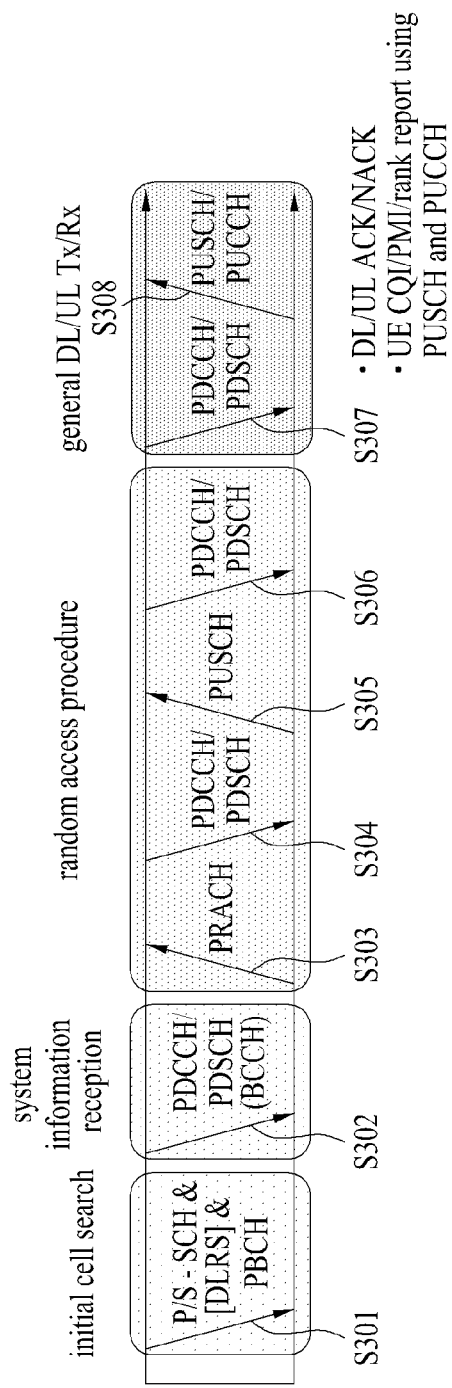
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
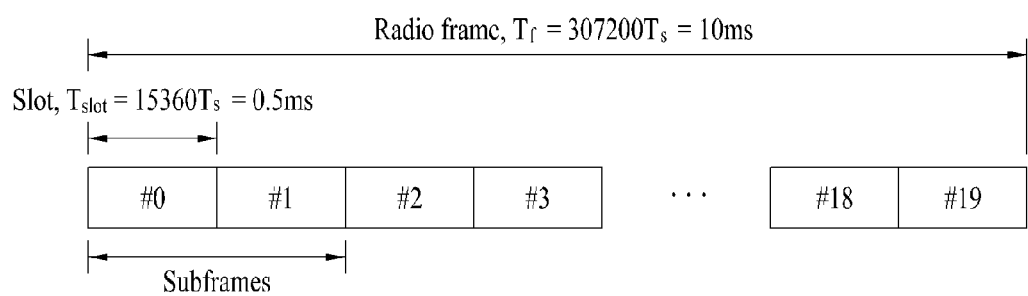
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
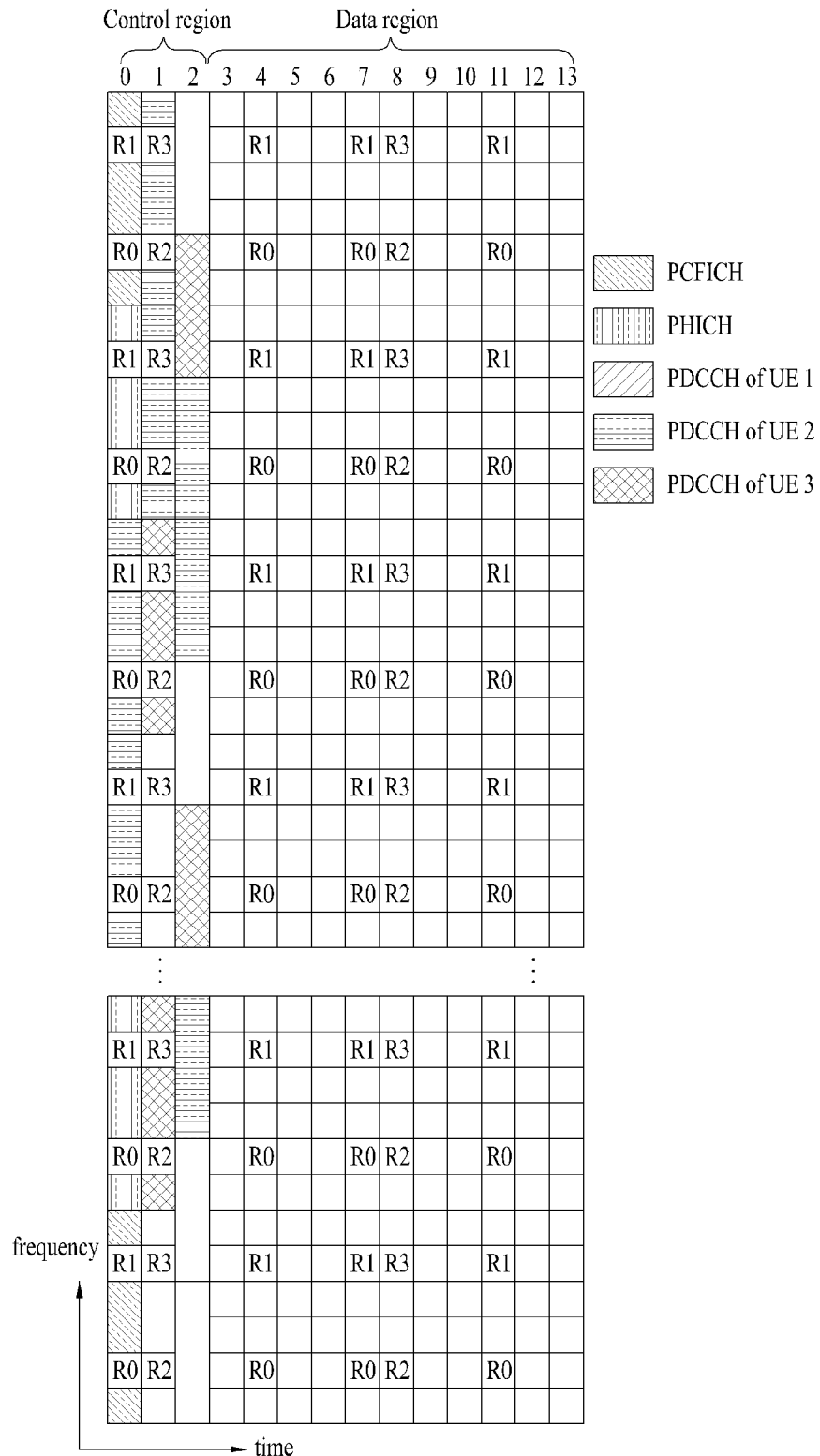
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
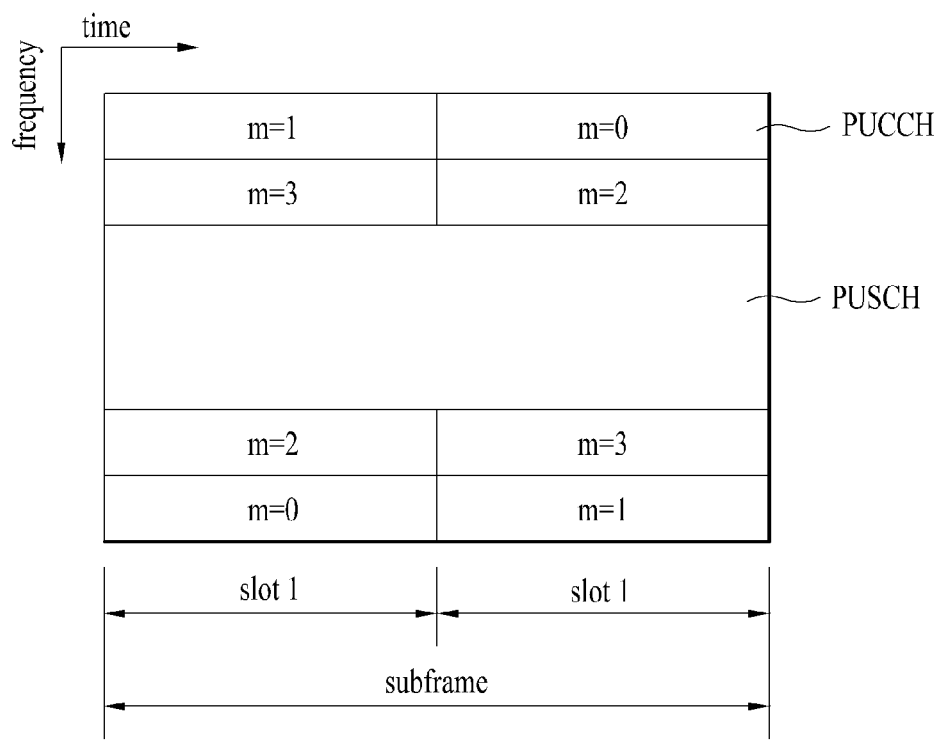
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)]. On the other hand, in CoMP-CS/CB (CoMP Coordinated Scheduling/Coordinated Beamforming), a user equipment can instantly receive data via a single base station, and more particularly, via a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

Meanwhile, CoMP scheme is applicable to a heterogeneous network as well as to a homogeneous network configured with macro eNB only.

Figure 7:
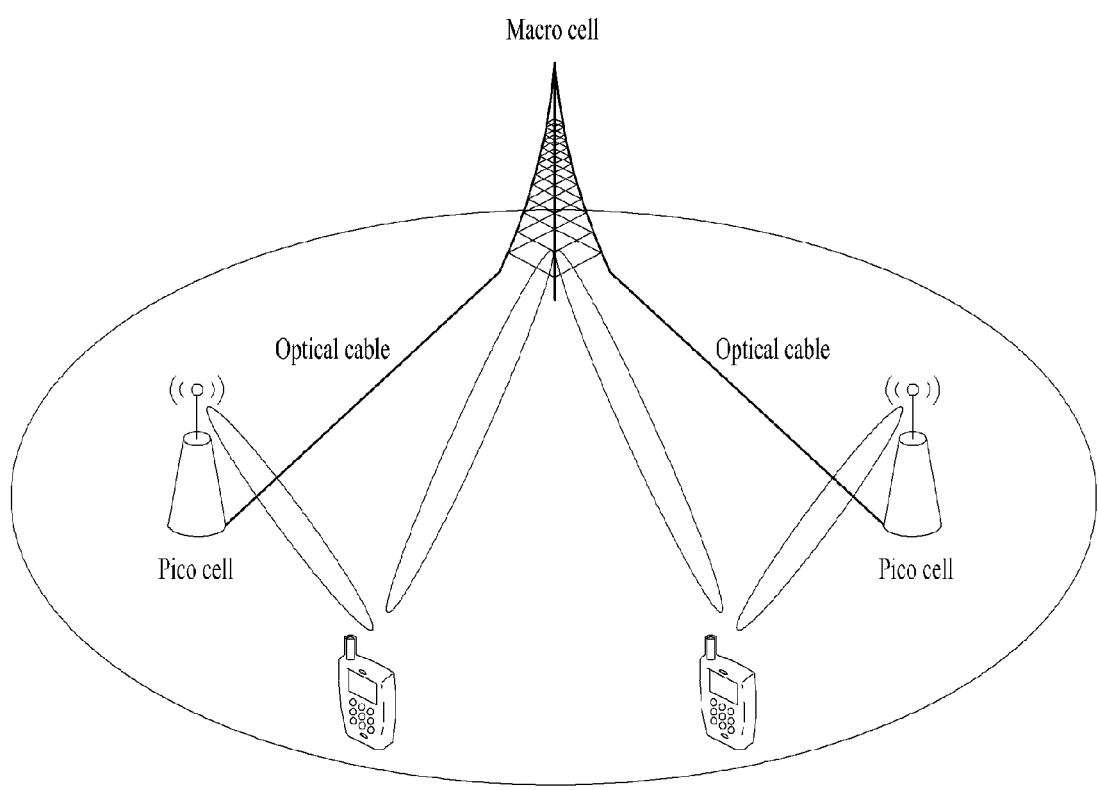
FIG. 7 is a diagram for one example of a configuration of a CoMP scheme applicable heterogeneous network.

FIG. 7 is a diagram for one example of a configuration of a CoMP scheme applicable heterogeneous network. Particularly, FIG. 7 shows a network including a macro eNB, an RRH (radio remote head) configured to transceive a signal with a relatively small transmit power, and the like. In this case, a pico cell or RRH located within a coverage of the macro eNB can be connected to the macro eNB via an optical cable or the like. Moreover, the RRH can be named a micro eNB.

Referring to FIG. 7, since a transmit power of an RRH is relatively smaller than that of a macro eNB, it can be observed that a coverage of each RRH is relatively smaller than that of the macro eNB.

The object of the above CoMP scenario is to expect a gain of an increasing overall system throughput through cooperative transmission in-between in a manner of covering a coverage hole of a specific area through RRHs added in comparison with a previous system, in which macro eNB exists, or utilizing a multitude of transmitting points (TPs) including RRH.

Meanwhile, RRHs shown in FIG. 7 can be sorted into two types. In particular, one of the two types corresponds to a case that a cell identifier (cell-ID) different from that of a macro eNB is granted to each of the RRHs. And, each of the RRHs is regarded as another small-scale cell. The other corresponds to a case that each of the RRHs operates with the same cell identifier of the macro eNB.

Figure 8:
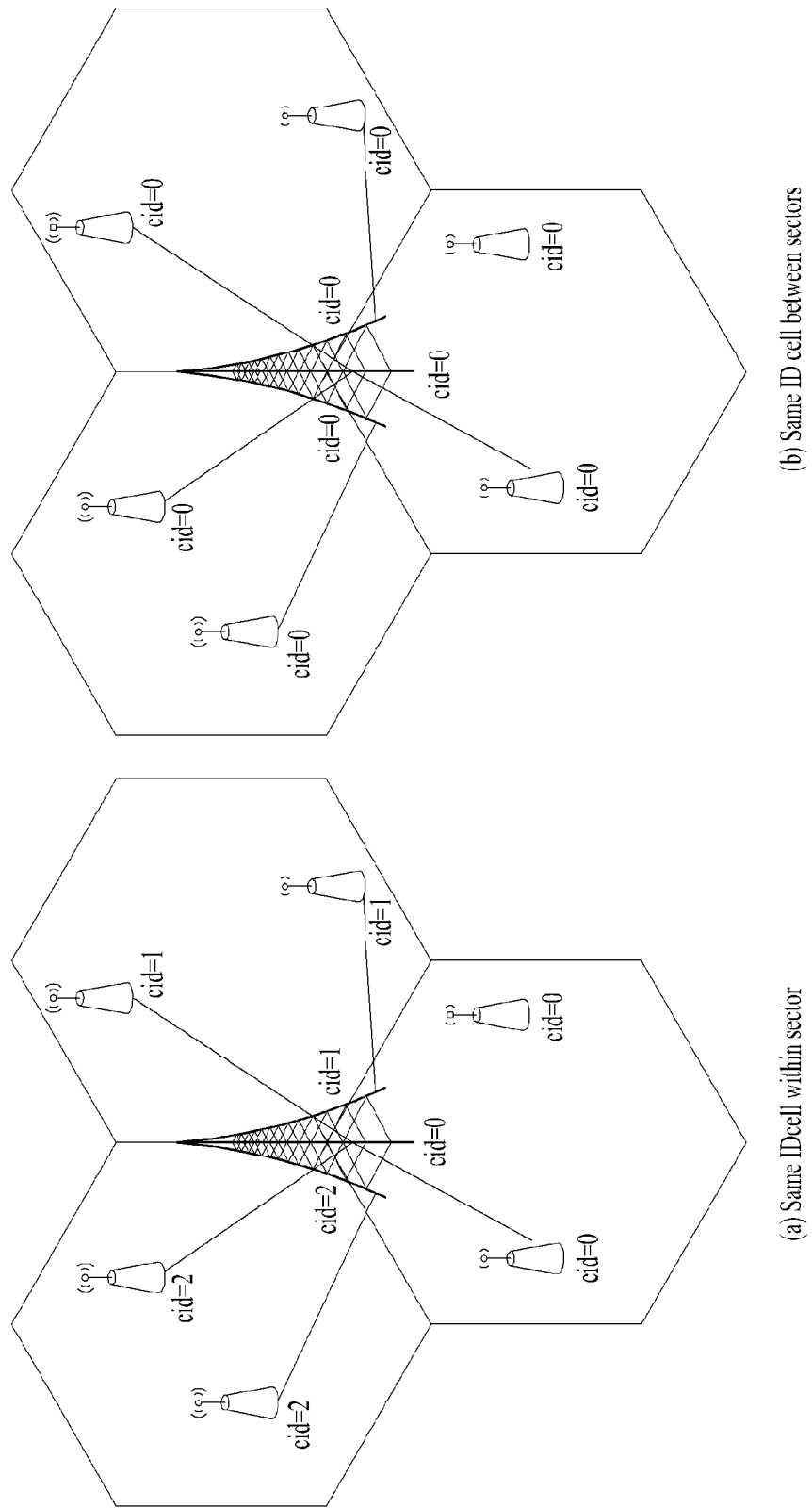
FIG. 8 is a diagram for one example of assigning a cell identifier to an RRH in a heterogeneous network.

FIG. 8 is a diagram for one example of assigning a cell identifier to an RRH in a heterogeneous network. Particularly, assume that a macro eNB has a cell coverage configured with 3 sectors.

First of all, looking into FIG. 8 (*a*) and FIG. 8 (*b*), it can be observed that a same cell identifier is assigned to every RRH located within the same sector. Yet, FIG. 8 (*a*) shows an example that different cell identifiers are assigned to different sectors, respectively, while FIG. 8 (*b*) shows an example that the same cell identifier is assigned to all sectors.

Meanwhile, since a cell-specific reference signal (cell-specific RS) is generally generated on the basis of a cell identifier, in case that each of an RRH and a macro eNB has the same cell identifier, the two nodes transmit the same cell-specific reference signal. Hence, CRS based PDCCH/PDSCH is simultaneously transmitted from the two nodes. Subsequently, a UE receives the PDCCH/PDSCH as if the signals received from the two nodes are considered as a single signal.

On the other hand, in case of PDSCH based on such a UE-specific reference signal as DM-RS and CSI-RS, the PDSCH can be independently transmitted to each UE which receives a corresponding RS from each node. Namely, if two nodes are spatially spaced apart from each other, each of the two nodes can perform an independent PDSCH transmission to each UE neighboring to the corresponding node in a manner of reusing a resource. In doing so, although a plurality of RRHs can transmit PDSCH to a number of UEs in a manner of reusing resources, it may be limited by capacity of PDCCH transmittable from an eNB.

For instance, in FIG. 8 (a), since a separate cell identifier is assigned to each sector, 3 data channels and 3 control channels can be discriminated by RS. On the other hand, in FIG. 8 (b), since a separate cell identifier is assigned to each sector, one control channel can be discriminated by RS. Of course, since PDSCH based on a UE-specific reference signal is transmitted in FIG. 8 (b), 3 data channels can be discriminated from each other. This is problem is caused because the PDCCH, i.e., the control channel is discriminated by the cell-specific reference signal CRS.

In order to solve the above problem, the present invention proposes a method for a macro eNB and an RRH to transmit PDCCH by dividing time in order for the RRH to transmit a control channel for a neighboring UE.

Figure 9:
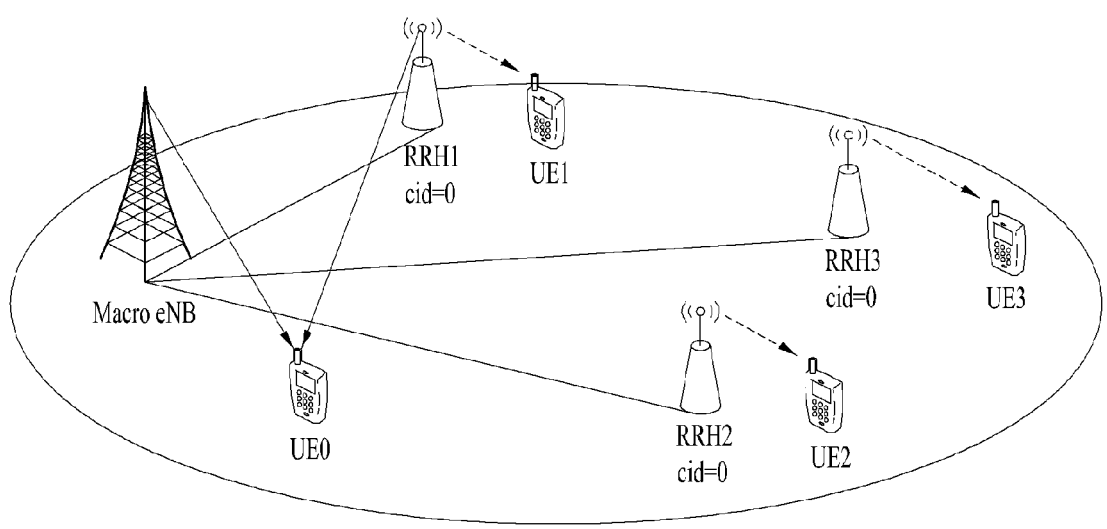
FIG. 9 is a diagram for one example that a macro eNB and an RRH, each of which has the same cell identifier, transmit data channels.

FIG. 9 is a diagram for one example that a macro eNB and an RRH, each of which has the same cell identifier, transmit data channels.

Referring to FIG. 9, assume that macro eNB and RRH1 perform JP for UE0. And, assume that the RRH1 performs an independent downlink transmission for UE1 neighbor to the RRH1 at the same timing point.

In this case, according to the present invention, each PDCCH is proposed to be transmitted in a different subframe to prevent PDCCH (0) for UE0 and PDCCH (1) for the UE1 neighbor to the RRH1 from interfering with each other.

Figure 10:
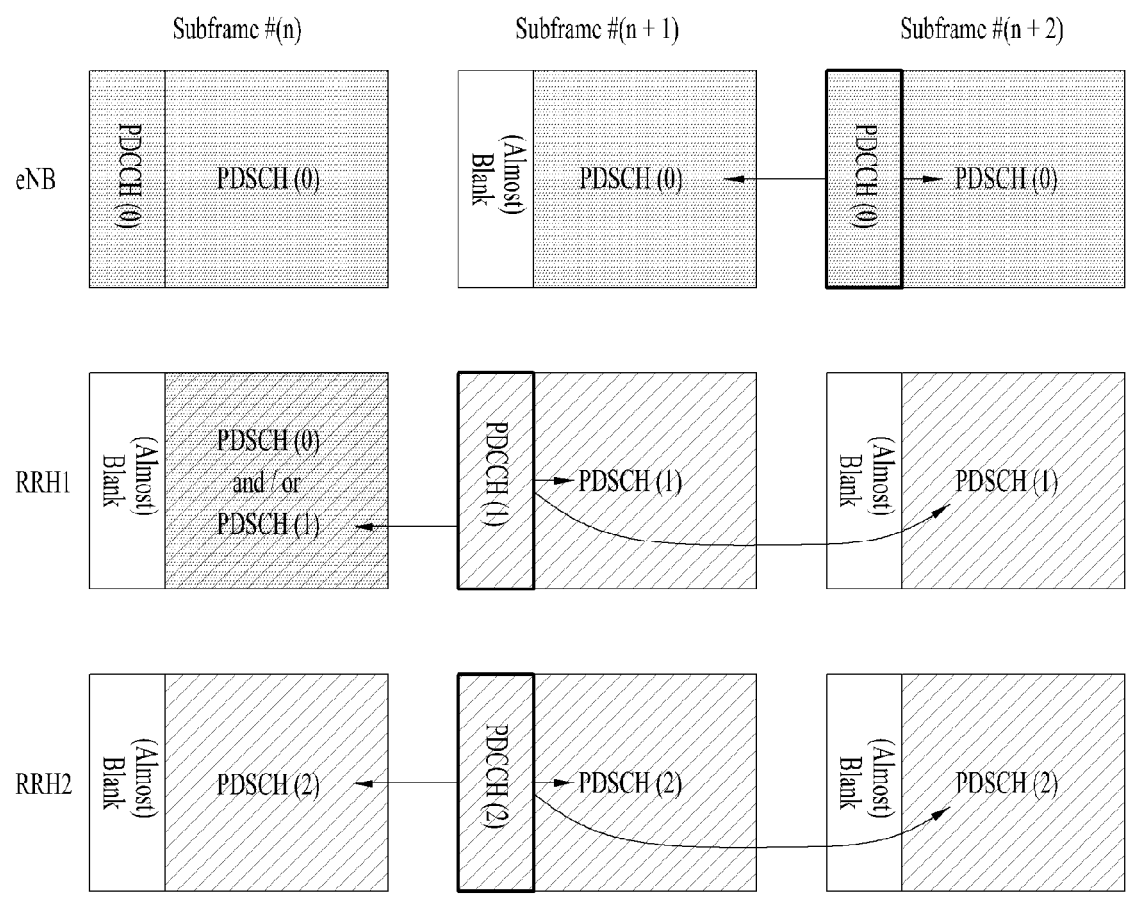
FIG. 10 is a diagram for one example that each of macro eNB and RRH transmits a control channel according to an embodiment of the present invention.

FIG. 10 is a diagram for one example that each of macro eNB and RRH transmits a control channel according to an embodiment of the present invention.

Referring to FIG. 10, in subframe #(n), RRH1 does not transmit PDCCH (1) for UE1 in a data region but transmits PDSCH (1) for the UE1 and/or PDSCH(0) for CoMP JP transmission. Yet, CRS is transmitted only in a control region or a signal may not be transmitted at all. PDCCH (0) for UE0 may be transmitted for CoMP JP transmission in the control region. And, it should be noted that the PDCCH (1) for the PDSCH (1) is not transmitted.

Subsequently, in a subframe #(n+1), a macro eNB transmits a CRS only in a control region for control channel transmissions of RRH1 and RRH2 or may not transmit a signal at all. In the subframe #(n+1), RRHs can transmit PDCCHs for neighbor UEs. In particular, UE1, which receives an independent downlink signal from RRH1, is able to perform decoding of PDSCH (1) by receiving PDCCH (1) for PDSCH (1) of subframe #(n) in subframe #(n+1). In doing so, preferably, the UE1 saves the PDSCH (1), which is received in the subframe #(n), in a buffer, receives the PDCCH (1) in the subframe #(n+1), and then decodes the PDSCH (1) saved in the buffer.

Moreover, the UE1 can perform decoding of PDSCH (1) received in a subframe #(n+2) using the PDCCH (1) received in the subframe #(n+1).

In the subframe #(n+1), the RRH1 and the RRH2 can simultaneously transmit PDCCH (1) and PDCCH (2), respectively, which is because cell coverage may not overlap each other by adjusting a spaced distance between the RRHs in establishing a cell. In doing so, the PDCCH (1) and the PDCCH (2) can be transmitted in concept of resource reuse rather than resource sharing.

In the same manner, the macro eNB transmits PDSCH (0) only in a prescribed subframe and may transmit PDCCH (0) for decoding the corresponding PDSCH (0) in a subframe different from the prescribed subframe.

Thus, the PDCCH transmission between the macro eNB and the RRH can be predetermined with reference to a subframe index. For instance, the macro eNB transmits PDCCH in an odd-numbered subframe, while the RRH transmits PDCCH in an even-numbered subframe.

Meanwhile, each UE having received UE-specific reference signal based PDSCH from RRH can feed back ACK/NACK of the corresponding PDSCH after 4 ms later than the subframe of receiving the PDCCH. In FIG. 10, if each UE receives PDSCH of the subframe #(n+1) and PDSCH of the subframe #(n+2) from the RRH1 or RRH2, the corresponding UE preferably transmits ACK/NACK for the PDSCH of the subframe #(n+1) and ACK/NACK for the PDSCH of the subframe #(n+2) together after 4 ms later than the subframe of receiving the PDCCH.

Figure 11:
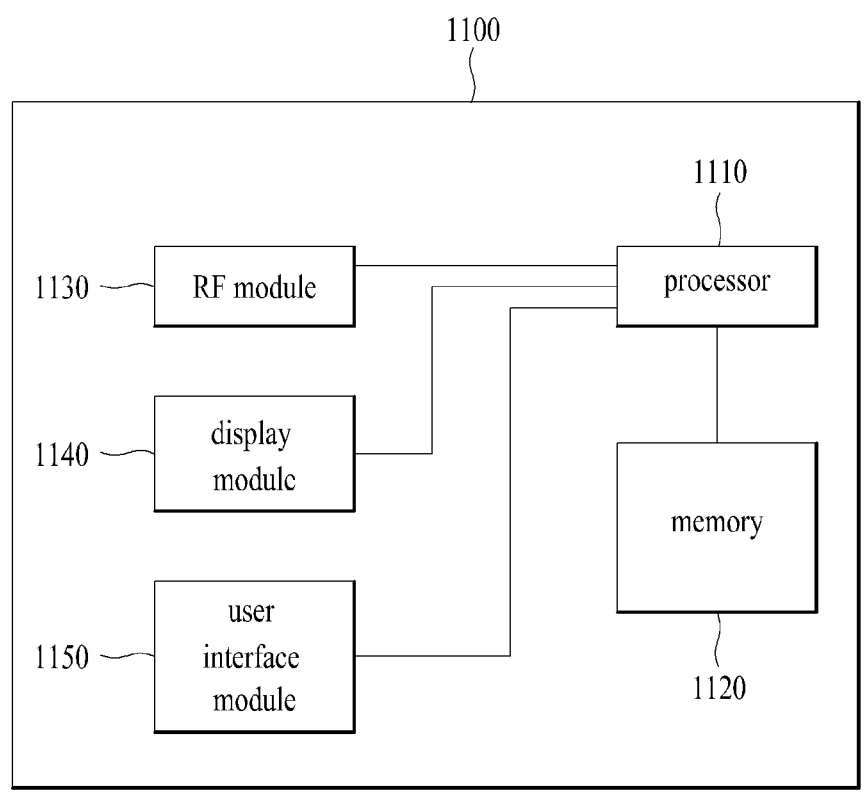
FIG. 11 is a block diagram for one example of a communication device according to one embodiment of the present invention.

FIG. 11 is a block diagram for one example of a communication device according to one embodiment of the present invention.

Referring to FIG. 11, a communication device 1100 includes a processor 1110, a memory 1120, an RF module 1130, a display module 1140 and a user interface module 1150.

The communication device 1100 is illustrated for clarity and convenience of the description and some modules can be omitted. Moreover, the communication device 1100 is able to further include at least one necessary module. And, some modules of the communication device 1100 can be further divided into sub-modules. The processor 1110 is configured to perform operations according to the embodiment of the present invention exemplarily described with reference to the accompanying drawings. In particular, the detailed operations of the processor 1110 can refer to the contents described with reference to FIGS. 1 to 10.

The memory 1120 is connected to the processor 1110 and stores operating systems, applications, program codes, data and the like. The RF module 1130 is connected to the processor 1110 and performs a function of converting a baseband signal to a radio signal or converting a radio signal to a baseband signal. For this, the RF module 1130 performs analog conversion, amplification, filtering and frequency uplink transform or inverse processes thereof. The display module 1140 is connected to the processor 1110 and displays various kinds of informations. The display module 1140 can include such a well-known element as LCD (Liquid Crystal Display), LED (Light Emitting Diode), OLED (Organic Light Emitting Diode) and the like, by which the present invention is non-limited. The user interface module 1150 is connected to the processor 1110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting a control channel in a multi-cell cooperative wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of transmitting a downlink signal in a multi-cell cooperative wireless communication system, the method comprising:
   transmitting a control channel and a data channel from a $1^{st}$ transmitting end and transmitting the data channel only by at least one $2^{nd}$ transmitting end, in a $1^{st}$ subframe; and
   transmitting the data channel only from the $1^{st}$ transmitting end and transmitting the control channel and the data channel from the at least one $2^{nd}$ transmitting end, in a $2^{nd}$ subframe,
   wherein the data channel transmitted from the at least one $2^{nd}$ transmitting end in the $1^{st}$ subframe is decoded based on the control channel transmitted from the at least one $2^{nd}$ transmitting end in the $2^{nd}$ subframe.

2. The method of claim 1, wherein the data channel transmitted from the at least one $2^{nd}$ transmitting end in the $1^{st}$ subframe comprises the data channel for a coordinated communication transmitted from the $1^{st}$ transmitting end and the at least one $2^{nd}$ transmitting end to a specific user equipment.

3. The method of claim 2, further comprising transmitting a control channel for decoding the data channel for the coordinated communication from the at least one $2^{nd}$ transmitting end in the $1^{st}$ subframe.

4. The method of claim 1, wherein:
   the at least one $2^{nd}$ transmitting end does not transmit the control channel on a control region in the $1^{st}$ subframe, and
   the $1^{st}$ transmitting end does not transmit the control channel on the control region in the $2^{nd}$ subframe.

5. The method of claim 1, wherein a response signal in response to the data channel transmitted from the at least one $2^{nd}$ transmitting end in the $1^{st}$ subframe is received in a subframe after a predetermined time later than the $2^{nd}$ subframe in which the control channel is transmitted from the at least one $2^{nd}$ transmitting end.

6. The method of claim 1, further comprising transmitting the control channel and the data channel from the $1^{st}$ transmitting end and transmitting the data channel from the at least one $2^{nd}$ transmitting end, in a $3^{rd}$ subframe,
   wherein the data channel transmitted from the at least one $2^{nd}$ transmitting end in the $3^{rd}$ subframe is decoded based on the control channel transmitted from the at least one $2^{nd}$ transmitting end in the $2^{nd}$ subframe.

7. The method of claim 6, wherein a response signal in response to the data channel transmitted from the at least one $2^{nd}$ transmitting end in the $3^{rd}$ subframe is received in a subframe after a predetermined time later than the $2^{nd}$ subframe in which the control channel is transmitted from the at least one $2^{nd}$ transmitting end.

8. The method of claim 1, wherein the $1^{st}$ transmitting end and the at least one $2^{nd}$ transmitting end have a same cell identifier.

9. A multi-cell cooperative wireless communication system, comprising:
   a $1^{st}$ transmitting end for transmitting a control channel and a data channel in a $1^{st}$ subframe and for transmitting the data channel only in a $2^{nd}$ subframe; and
   at least one $2^{nd}$ transmitting end for transmitting the data channel only in the $1^{st}$ subframe and for transmitting the control channel and the data channel in the $2^{nd}$ subframe,
   wherein the data channel transmitted from the at least one $2^{nd}$ transmitting end in the $1^{st}$ subframe is decoded based on the control channel transmitted from the at least one $2^{nd}$ transmitting end in the $2^{nd}$ subframe.

10. The multi-cell cooperative wireless communication system of claim 9, wherein the data channel transmitted from the at least one $2^{nd}$ transmitting end in the $1^{st}$ subframe comprises the data channel for a coordinated communication transmitted from the $1^{st}$ transmitting end and the at least one $2^{nd}$ transmitting end to a specific user equipment.

11. The multi-cell cooperative wireless communication system of claim 10, wherein the at least one $2^{nd}$ transmitting end transmits a control channel for decoding the data channel for the coordinated communication from the at least one $2^{nd}$ transmitting end in the $1^{st}$ subframe.

12. The multi-cell cooperative wireless communication system of claim 9, wherein the at least one $2^{nd}$ transmitting end does not transmit the control channel on a control region in the $1^{st}$ subframe and wherein the $1^{st}$ transmitting end does not transmit the control channel on the control region in the $2^{nd}$ subframe.

13. The multi-cell cooperative wireless communication system of claim 9, wherein a response signal in response to the data channel transmitted by the at least one $2^{nd}$ transmitting end in the $1^{st}$ subframe is received in a subframe after a predetermined time later than the $2^{nd}$ subframe in which the control channel is transmitted by the at least one $2^{nd}$ transmitting end.

14. The multi-cell cooperative wireless communication system of claim 9, wherein in a $3^{rd}$ subframe, the $1^{st}$ transmitting end transmits the control channel and the data channel and the at least one $2^{nd}$ transmitting end transmits the data channel only and wherein the data channel transmitted by the at least one $2^{nd}$ transmitting end in the $3^{rd}$ subframe is decoded based on the control channel transmitted by the at least one $2^{nd}$ transmitting end in the $2^{nd}$ subframe.

15. The multi-cell cooperative wireless communication system of claim 14, wherein a response signal in response to the data channel transmitted by the at least one $2^{nd}$ transmitting end in the $3^{rd}$ subframe is received in a subframe after a predetermined time later than the $2^{nd}$ subframe in which the control channel is transmitted by the at least one $2^{nd}$ transmitting end.

16. The multi-cell cooperative wireless communication system of claim 9, wherein the $1^{st}$ transmitting end and the at least one $2^{nd}$ transmitting end have a same cell identifier.

* * * * *